(12) United States Patent
Kim et al.

(10) Patent No.: US 8,749,265 B2
(45) Date of Patent: Jun. 10, 2014

(54) SEMICONDUCTOR CHIP AND METHOD FOR GENERATING DIGITAL VALUE USING PROCESS VARIATION

(75) Inventors: Dong Kyue Kim, Seoul (KR); Byong-Doek Choi, Seoul (KR)

(73) Assignee: ICT Korea Co., Ltd., Seoul (KR)

( * ) Notice: Subject to any disclaimer, the term of this patent is extended or adjusted under 35 U.S.C. 154(b) by 218 days.

(21) Appl. No.: 13/265,776

(22) PCT Filed: Dec. 2, 2009

(86) PCT No.: PCT/KR2009/007130
§ 371 (c)(1),
(2), (4) Date: Oct. 21, 2011

(87) PCT Pub. No.: WO2010/123185
PCT Pub. Date: Oct. 28, 2010

(65) Prior Publication Data
US 2012/0037711 A1 Feb. 16, 2012

(30) Foreign Application Priority Data
Apr. 23, 2009 (KR) .................. 10-2009-0035416

(51) Int. Cl.
*H03K 19/177* (2006.01)
*G11C 7/10* (2006.01)

(52) U.S. Cl.
USPC ................ 326/8; 365/189.05; 365/189.15

(58) Field of Classification Search
USPC ......... 326/8, 40, 46; 365/189.05, 189.15, 195
See application file for complete search history.

(56) References Cited

U.S. PATENT DOCUMENTS

| | | | |
|---|---|---|---|
| 2002/0075731 A1* | 6/2002 | Amano | 365/196 |
| 2004/0136529 A1 | 7/2004 | Rhelimi et al. | |
| 2005/0082664 A1 | 4/2005 | Funaba et al. | |
| 2006/0063286 A1 | 3/2006 | Bidermann et al. | |
| 2007/0002619 A1* | 1/2007 | Schoenauer et al. | 365/185.08 |
| 2010/0202219 A1* | 8/2010 | Chen et al. | 365/189.05 |

FOREIGN PATENT DOCUMENTS

| | | |
|---|---|---|
| EP | 1341214 A1 | 9/2003 |
| EP | 1465254 A1 | 10/2004 |
| EP | 1715409 A1 | 10/2006 |

OTHER PUBLICATIONS

Kumar, S. et al., "Extended Abstract: The Butterfly PUF Protecting IP on every FPGA," HST '08 Proceedings of the 2008 IEEE International Workshop on Hardware-Oriented Security and Trust, Jun. 9, 2008, 4 pages.
International Search Report from EP No. 09843713.0, dated Nov. 7, 2012, 12 pages.

* cited by examiner

*Primary Examiner* — Daniel D Chang
(74) *Attorney, Agent, or Firm* — Marger, Johnson & McCollom, P.C.

(57) ABSTRACT

Provided is a semiconductor chip to generate an identification key. The semiconductor chip may include a first inverter having a first logic threshold, a second inverter having a second logic threshold, and a first switch. The first switch may include a first terminal and a second terminal, and may short or open a connection between the first terminal and the second terminal according to an first input voltage value. An input terminal of the first inverter, an output terminal, and the first terminal of the first switch may be connected to a first node. An output terminal of the first inverter, an input terminal of the second inverter, and the second terminal of the first switch may be connected to a second node.

11 Claims, 15 Drawing Sheets

US 8,749,265 B2

SEMICONDUCTOR CHIP AND METHOD FOR GENERATING DIGITAL VALUE USING PROCESS VARIATION

RELATED APPLICATION

This application claims priority from Korean Patent Application No. 10-2009-0035416, filed Apr. 23, 2009, which is incorporated herein by reference.

TECHNICAL FIELD

The following description relate to a semiconductor chip and a method of generating an identification key.

BACKGROUND ART

Currently, with the development of technologies for electronic tags and the like, there has been an increasing need to insert a unique identification key into each of chips that are produced on a large scale. Accordingly, there is a need for a system and a method that may generate a digital value, for example, identification key, a unique ID, and the like.

An example of existing methods to generate and insert an identification key into each of chips may include a method using hardware or software.

However, the above method of generating the identification key using hardware or software may increase costs for development or production of software, which results in increasing a chip unit cost and a production cycle.

Accordingly, there is a need for a system and method that may generate and manage an irreproducible digital value with low costs and a simple manufacturing process.

When manufacturing an integrated circuit (IC) chip, a plurality of identical circuit elements may be integrated within a single chip. In this case, the plurality of identical circuit elements may be provided on the same wafer through the same manufacturing process according to the same design rule.

Accordingly, macroscopic electrical characteristics or digital characteristics of circuit elements may be the same, whereas micro electrical characteristics or analog characteristics of circuit elements may not be exactly the same. The above slight differences result from a process variation existing in a semiconductor process. Regardless of how excellent a corresponding process is, the process variation of the process may not completely eliminate the process variation.

DISCLOSURE OF INVENTION

Technical Goals

Exemplary embodiments of the present invention provide a semiconductor chip that may generate a physically irreproducible digital value or identification key having a simple structure based on a process variation occurring in a manufacturing process of a semiconductor chip.

Exemplary embodiments of the present invention provide a semiconductor chip that may generate a digital value or identification key that satisfies the following three conditions.

First, once the semiconductor chip is manufactured, the digital value or the identification key generated by the semiconductor chip always remains the same value. That is, whenever the digital value or the identification key is measured after being manufactured, the same value is returned.

Second, it is actually impossible to make a semiconductor chip to produce the same digital value or identification key of another semiconductor chip, even if the semiconductor chip is manufactured by the same manufacturing process as the other semiconductor chip. That is, the semiconductor chip manufactured by the present invention is irreproducible or unclonable.

Third, when a plurality of semiconductor chips are manufactured at the same time by the same manufacturing process, the digital value or the identification key generated by each of the semiconductor chips are all different. That is, the digital value or the identification key manufactured by the present invention is unique.

Exemplary embodiments of the present invention provide a semiconductor chip that may compare logic thresholds of two inverters, manufactured from the same process, to thereby generate an identification key, although the logic thresholds of the inverters are not accurately known.

Technical Solutions

According to an aspect of the present invention, there is provided a semiconductor chip including: N unit cells to output a digital value of N bits, where N denotes a natural number. Each of the N unit cells may include a first element and a second element that constitute a pair. An output of the first element may be connected to an input of a second element, and an output of the second element may be connected to an input of the first element to constitute a feedback structure. Also, each of the N unit cells generates a one-bit identification key due to an electrical characteristic value difference between the first element and the second element.

The pair of elements including the first element and the second element may be manufactured from the same process. The electrical characteristic value difference may result from a process variation.

According to another aspect of the present invention, there is provided a semiconductor chip including N unit cells to output an identification key of N bits, where N denotes a natural number. Each of the N unit cells includes a pair of inverters and a switch. Also, an input terminal of one inverter among the pair of inverters is connected to an output terminal of another inverter. An output terminal of the one inverter may be connected to an input terminal of the other inverter. One terminal of the switch may be connected to the input terminal of the one inverter, and another terminal of the switch may be connected to the output terminal of the one inverter.

The one inverter and the other inverter may be manufactured from the same process, and a logic threshold of the one inverter may be different from a logic threshold of the other inverter due to a process variation. When the switch is closed, the input terminal and the output terminal of the one inverter, and the input terminal and the output terminal of the other inverter may be shorted with each other, and a voltage value of the shorted terminals may correspond to a value between a logic threshold of the one inverter and a logic threshold of the other inverter. When the switch is closed, then is re-opened, the identification key may be generated based on a logic level of a voltage value of at least one of the output terminal of the one inverter and the output terminal of the other inverter. In a case where the switch is closed, then is re-opened, the identification key may be generated as "1" when the logic level of the voltage value of the output terminal of the one inverter is high, and the identification key may be generated as "0" when the logic level of the voltage value of the output terminal of the one inverter is low.

The semiconductor chip may further include a second switch, which is connected between the input terminal of the one inverter and a ground, to be always in an open status, and a third switch, which is connected between the output terminal of the one inverter and an output terminal of a unit cell containing the one inverter, to transfer a voltage of the output terminal of the one inverter to the output terminal of the unit cell containing the one inverter, when the identification key is required.

According to still another aspect of the present invention, there is provided a semiconductor chip including an identification key generator and a secure key generator. The identification key generator generates an identification key of N bits, where N denotes a natural number. The identification key generator may include N unit cells, and each of the N unit cells generates a one-bit identification key based on a process variation. Also, the secure key generator may generate a secure key using the identification key.

In this instance, a first unit cell of the N unit cells may include a first inverter having a first logic threshold and a second inverter having a second logic threshold, and an input terminal of the first inverter and an output terminal of the second inverter may be connected to a first node, and an output terminal of the first inverter and an input terminal of the second inverter are connected to a second node. The first inverter and the second inverter may be manufactured from the same process, and the first logic threshold may be different from the second logic threshold due to a process variation.

Also, when a connection between the first node and the second node is open by opening a first switch that is connected between the first node and the second node after shorting the first node and the second node by closing the first switch, the one-bit identification key corresponding to the first unit cell may be generated based on a logic level of a voltage value of at least one of the first node and the second node.

Also, when the logic level of the voltage value of the second node is high after the opening of a connection between the first node and the second node, the one-bit identification key corresponding to the first unit cell may be generated as "1". Also, when the logic level of the voltage value of the second node is low after the opening of a connection between the first node and the second node, the one-bit identification key corresponding to the first unit cell may be generated as "0".

Also, the semiconductor chip may further include a processor to perform at least one of a digital signature, a user identification/authentication, and data encryption/decryption using the secure key.

According to yet another aspect of the present invention, there is provided a semiconductor chip including a first inverter having a first logic threshold, a second inverter having a second logic threshold, and a first switch, including a first terminal and a second terminal, to short or open a connection between the first terminal and the second terminal according to an first input voltage value. An input terminal of the first inverter, an output terminal of the second inverter, and the first terminal of the first switch are connected to a first node, an output terminal of the first inverter, an input terminal of the second inverter, and the second terminal of the first switch are connected to a second node, and an identification key is generated using a difference between the first logic threshold and the second logic threshold.

In this instance, the first inverter and the second inverter may be manufactured from the same process, and the first logic threshold is different from the second logic threshold due to a process variation.

Also, when a logic level of the first input voltage value is high, the first switch may short the first node and the second node, and a voltage value of the shorted first node and second node may correspond to a value between the first logic threshold and the second logic threshold.

Also, when the logic level of the first input voltage value is changed from high to low, the identification key may be generated based on the logic level of at least one of the voltage value of the first node and the voltage value of the second node.

Also, when the logic level of the voltage value of the second node is high, the identification key may be generated as "1". Also, when the logic level of the voltage value of the second node is low, the identification may be generated as "0".

Also, the semiconductor chip may include a second switch, being connected between the first node and a ground, to be always in an open status, and a third switch, being connected between the second node and an output terminal of the semiconductor chip, to short or open a connection between the second node and the output terminal of the semiconductor chip according to an second input voltage value.

Also, when a logic level of the first input voltage value is changed from high to low and then a logic level of the second input voltage value is changed from low to high, the identification key may be generated based on a logic level of a voltage value of the output terminal.

According to still another aspect of the present invention, there is provided a semiconductor chip including a first inverter having a first logic threshold, a second inverter having a second logic threshold, and a comparator, including a first input terminal, a second input terminal, and an output terminal, to determine a logic level of a voltage of the output terminal based on a voltage comparison between the first input terminal and the second input terminal. An input terminal and an output terminal of the first inverter are connected to the first input terminal of the comparator, and an input terminal and an output terminal of the second inverter are connected to the second input terminal of the comparator.

In this instance, the first inverter and the second inverter may be manufactured from the same process, and the first logic threshold is different from the second logic threshold due to a process variation.

According to still another aspect of the present invention, there is provided a semiconductor chip including N inverters, each having an input terminal and an output terminal shorted, where N denotes a natural number, a selector to select, from the N inverters, a first inverter having a first logic threshold and a second inverter having a second logic threshold, and a comparator to compare a voltage of an output terminal of the first inverter and a voltage of an output terminal of the second inverter. The comparator determines a logic level of a voltage of an output terminal of the comparator based on a comparison result.

In this instance, the first inverter and the second inverter may be manufactured from the same process, and the first logic threshold is different from the second logic threshold due to a process variation.

According to still another aspect of the present invention, there is provided a semiconductor chip including a differential amplifier and a comparator. The differential amplifier includes a first input terminal, a second input terminal, a first output terminal, and a second output terminal. When the first input terminal and the second input terminal are shorted with each other whereby the same voltage is applied, a voltage of the first output terminal is different from a voltage of the second output terminal due to a process variation. The comparator compares the voltage of the first output terminal and the voltage of the second output terminal, and determines a logic level of an output voltage of the comparator based on a comparison result.

According to still another aspect of the present invention, there is provided a semiconductor chip including N differential amplifiers where N denotes a natural number, a selector to select a first differential amplifier from the N differential amplifiers, wherein the first amplifier includes a first input terminal, a second input terminal, a first output terminal, and a second output terminal, and a comparator to compare a voltage of the first output terminal of the selected first differential amplifier and a voltage of the second output terminal of the selected first differential amplifier. When the first input terminal and the second input terminal are shorted with each other whereby the same voltage is applied, the voltage of the first output terminal of the first differential amplifier is different from the voltage of the second output terminal of the first differential amplifier due to a process variation, and the comparator determines a logic level of a voltage of an output terminal of the comparator.

According to still another aspect of the present invention, there is provided a method of generating an identification key. The method includes shorting a first node and a second node by closing a first switch that is connected between the first node and the second node, the first node being connected to an input terminal of a first inverter having a first logic threshold and an output terminal of a second inverter having a second logic threshold, and the second node being connected to an output terminal of the first inverter and an input terminal of the second inverter, opening a connection between the first node and the second node, and generating the identification key based on a logic level of a voltage value of at least one of the first node and the second node.

In this instance, the first inverter and the second inverter may be manufactured from the same process, and the first logic threshold is different from the second logic threshold due to a process variation.

Also, the shorting may include shorting the first node and the second node by applying a logic high as a logic level of a voltage value to a first switch that is connected between the first node and the second node.

Also, the generating may include generating the identification key as "1" when the logic level of the voltage value of the second node is high, and generating the identification key as "0" when the logic level of the voltage value of the second node is low.

Advantageous Effect

According to embodiments of the present invention, it is possible to simplify a structure of a circuit for generating an identification key using a process variation, occurring in a manufacturing process of a semiconductor chip, and to decrease costs.

According to embodiments of the present invention, a semiconductor chip that generates a digital value or identification key that satisfies the following three conditions may be obtained. First, once the semiconductor chip is manufactured, the digital value or the identification key generated by the semiconductor chip always remains the same value. That is, whenever the digital value or the identification key is measured after being manufactured, the same value is returned. Second, it is actually impossible to make a semiconductor chip to produce the same digital value or identification key of another semiconductor chip, even if the semiconductor chip is manufactured by the same manufacturing process as the other semiconductor chip. That is, the semiconductor chip manufactured by the present invention is irreproducible or unclonable. Third, when a plurality of semiconductor chips are manufactured at the same time by the same manufacturing process, the digital value or the identification key generated by each of the semiconductor chips are all different. That is, the digital value or the identification key manufactured by the present invention is unique.

Also, according to embodiments of the present invention, since a physical duplication of a circuit is impossible, a high security may be guaranteed.

Also, according to embodiments of the present invention, although accurate logic thresholds of two inverters manufactured from the same process are not known, an identification key may be generated through a comparison between the logic thresholds of the two inverters. Therefore, in the generated identification key, that is, a digital value, frequencies of "0" may be similar to frequencies of "1".

Also, according to embodiments of the present invention, it is possible to increase a number of bits of an identification key while using a very small area of a semiconductor chip.

BEST MODE FOR CARRYING OUT THE INVENTION

Figure 1:
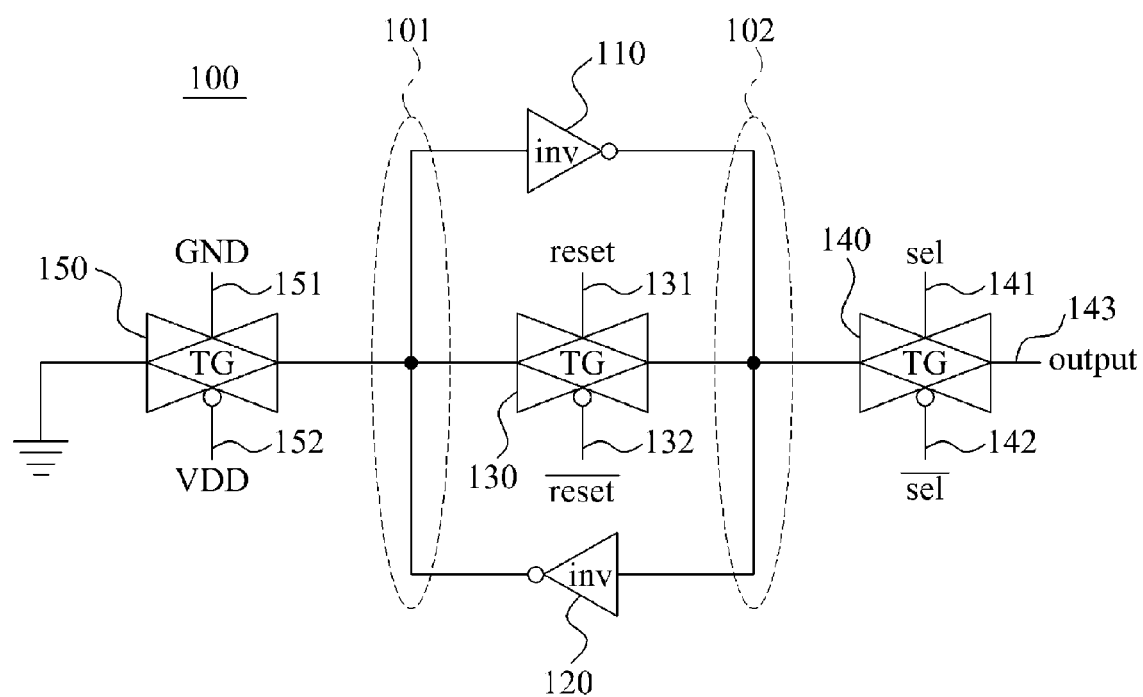
FIG. 1 is a diagram illustrating semiconductor chip according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Semiconductor chips to generate an identification key according to some embodiments of the present invention may be implemented on a single semiconductor chip. However, the present invention is not limited to the described exemplary embodiments. Instead, it should be appreciated by those skilled in the art that changes may be made to these exemplary embodiments without departing from the principles and spirit of the invention. For example, semiconductor chips to generate an identification key according to some embodiments of the present invention may be implemented using a plurality of semiconductor chips. Semiconductor chips to generate an identification key according to some embodiments of the present invention may be implemented using an equivalent circuit, an apparatus or a system.

FIG. 1 is a diagram illustrating a semiconductor chip 100 to generate an identification key according to an embodiment of the present invention.

The identification key generation apparatus 100 may be provided on a semiconductor chip. Embodiments of the identification key generation apparatus 100, described below, may also be embodied on the semiconductor chip.

The semiconductor chip being a backbone of the current electronics industry may be produced using a large number of processes and elements, and may also be utilized in various types of industry fields. When using an electrical characteristic difference between elements that may occur due to a process variation of a manufacturing process of the semiconductor chip, it is possible to generate a random digital value or an identification key that is unreproducible and has a permanent property.

Also, the semiconductor chip includes various types of chips, modules, and other systems that may be provided using various semiconductor elements. Therefore, the semiconductor chip described below may need to be understood to include various types of chips produced from other processes in addition to the semiconductor process.

The processes to produce the semiconductor chip according to embodiments of the present invention may be implemented using diversified manufacturing processes.

In this case, a passive element and an active element may be provided on the semiconductor chip. The active element may be a transistor or a diode. The passive element may be a resistance, a capacitor, an inductor, and a wire between elements. However, the transistor, the diode, the resistance, the capacitor, the inductor, and the wire are only examples of active elements and passive elements and thus the present invention is not limited thereto.

According to an embodiment of the present invention, it is possible to generate an identification key that is physically unreproducible and is permanent once the identification key is generated, using a process variation of a process to produce an element or a circuit consisting of a plurality of elements on a semiconductor chip. Once the semiconductor chip according to an embodiment of the present invention is manufactured, an identification key generated by the semiconductor chip maintains the same value and does not change. That is, the same value can be obtained at any time from the semiconductor chip according to an embodiment of the present invention, once it is manufactured.

The aforementioned elements are only examples and thus the present invention is not limited thereto. Specifically, the present invention may be applicable to generate a digital value using a process variation existing in various element or circuit manufacturing processes.

For example, the circuit may be a transistor circuit, an inverter circuit, an amplifier circuit such as a differential amplifier circuit, and the like. The above circuits are only examples. The present invention may widely include embodiments using the circuit consisting of elements included in the semiconductor chip. For example, the circuit may include a single element circuit or a plurality of elements including at least one of the transistor, the resistance, the capacitor, and the inductor.

The process variation may occur due to a variation of various parameters within the manufacturing process. For example, in the case of the transistor, parameters such as a valid gate length, a doping concentration index, an oxide thickness index, a threshold, and the like may cause the process variation.

The semiconductor chip 100 may generate an identification key of a one bit, for example, "0" or "1".

The semiconductor chip 100 may be used as a unit cell of a larger circuit. The semiconductor chip 100 may generate the identification key of N bits by disposing N unit cells. Here, N denotes a natural number.

A first inverter 110 may have a first logic threshold. A second inverter 120 may have a second logic threshold.

The first inverter 110 and the second inverter 120 may be manufactured from the same process. The first logic threshold may be different from the second logic threshold due to a process variation.

A first switch 130 may include a first terminal and a second terminal. The first switch 130 may short or open a connection between the first terminal and the second terminal according to an first input voltage value. As shown in FIG. 1, the first switch 130 may be embodied using a transmission gate TG, however, the present invention is not limited thereto. Any type of switching elements that may short or open a connection between nodes may be utilized.

An input terminal of the first inverter 110, an output terminal of the second inverter 120, and the first terminal of the first switch 130 may be connected to a first node 101. An output terminal of the first inverter 110, an input terminal of the second inverter 120, and the second terminal of the first switch 130 may be connected to a second node 102.

As described above, the first switch 130 may be embodied using the transmission gate TG. A second switch 150 and a third switch 140 may also be embodied using the transmission gate TG.

When a voltage denoting a high logic level is applied to a reset terminal 131 of the first switch 130, the first switch 130 shorts the first node 101 and the second node 102 with each other. A voltage denoting a low logic level may be applied to a reset bar terminal 132 of the first switch 130.

In this case, a voltage value of the shorted first node 101 and second node 102 may correspond to a value between the first logic threshold and the second logic threshold.

When the logic level of the voltage value of the reset terminal 131 is changed from high to low after the first node 101 and the second node 102 are shorted with each other, the first switch 130 may be open. Therefore, a voltage value of the first node 101 may be different from a voltage value of the second node 102.

For example, when the logic level of one node of the first node 101 and the second node is "1", the logic level of another node may be "0". In this case, a voltage denoting a high logic level may be applied to a sel terminal 141 of the third switch 140 and a voltage denoting a low logic level may be applied to a sel bar terminal 142 of the third switch 140. When the third switch 140 is closed, the second node 102 and an output terminal 143 may be shorted with each other and a voltage of the second node 102 may be transferred to the output terminal 143.

Next, a logic level of the voltage of the output terminal 143 may be determined to determine the generated identification key as "1" or "0".

Since an input terminal 151 of the second switch 150 is grounded and an input bar terminal 152 of the second switch 150 is connected to VDD, is the second switch 150 may be always in an open status. The second switch 150 functions as a dummy switch in order to maintain a circuit symmetry.

Figure 2:
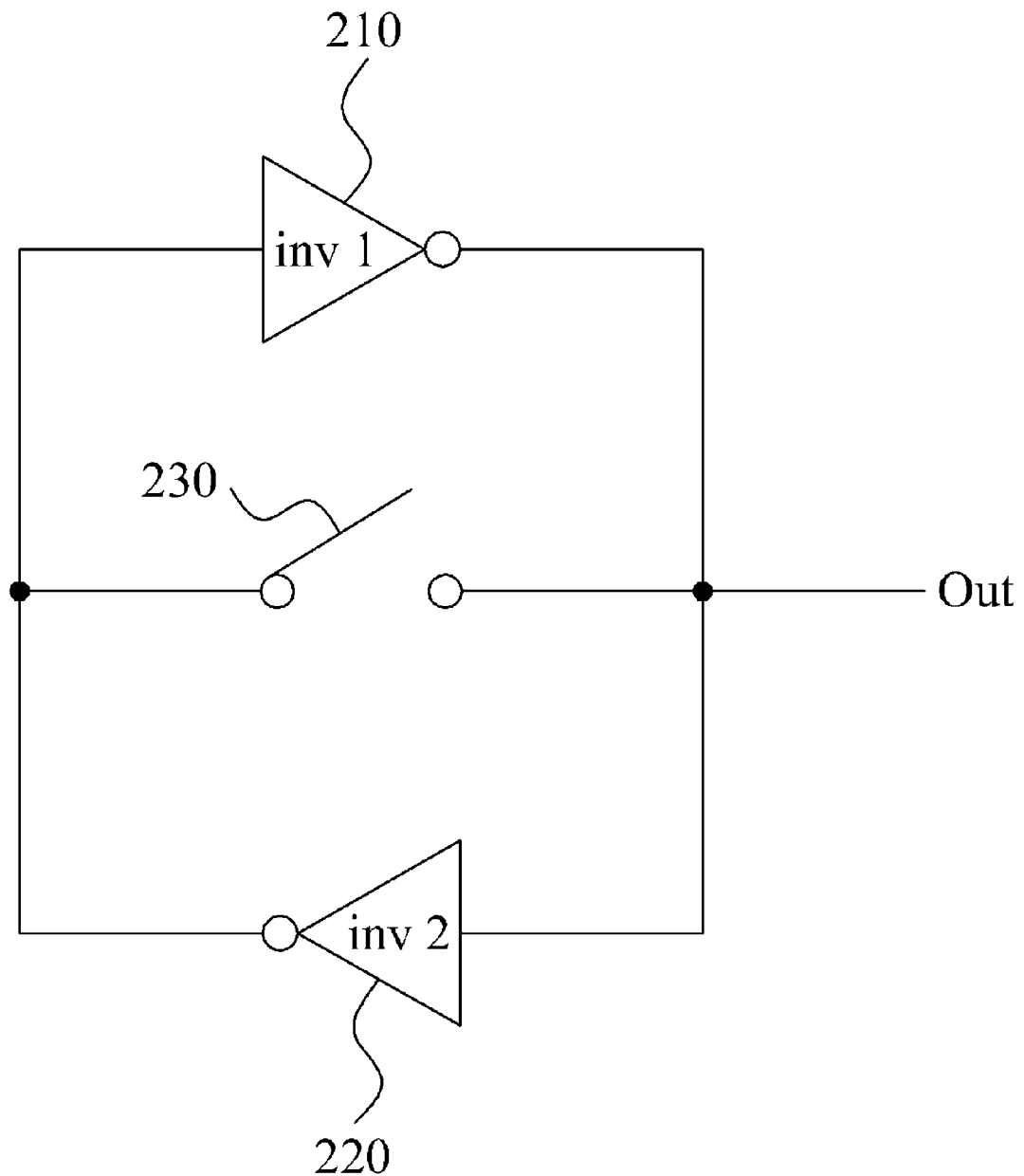
FIG. 2 is a circuit diagram for describing an operation of a semiconductor chip according to an embodiment of the present invention.

FIG. 2 is a circuit diagram for describing an operation of a semiconductor chip according to an embodiment of the present invention.

A first inverter (INV1) 210 may have a first logic threshold and a second inverter (INV2) 220 may have a second logic threshold. Here, a logic threshold denotes a voltage value in a case where an input voltage of an inverter is the same as an output voltage of the inverter. The logic threshold may be measured using a voltage value in a case where the input terminal and the output terminal of the operating inverter are shorted with each other.

Inverters manufactured from the same process may be designed to theoretically have the same logic threshold. However, as described above, since the process variation exists in the actual manufacturing process, any two inverters may not have the exact same logic threshold.

Even though the first inverter (INV1) 210 and the second inverter (INV2) 220 may be manufactured in the same manufacturing process, a difference may exist between the logic threshold of the first inverter (INV1) 210 and the logic threshold of the second inverter (INV2) 220 due to the process variation.

The difference between the logic thresholds may be different depending on processes, for example, may be a few to tens of mill volts. Therefore, due to a measurement error, it may be inaccurate to measure the logic threshold of the first inverter (INV1) 210 and the logic threshold of the second inverter (INV2) 220 using a separate comparator circuit.

Accordingly, there is a need for a scheme that may relatively compare logic thresholds of two inverters, for example, a scheme that may measure the logic thresholds without using the separate comparator circuit. According to an embodiment of the present invention, it is possible to determine which logic threshold is higher by relatively comparing the logic thresholds of the two inverters without using the comparator circuit.

In a case where the second inverter (INV2) 220 does not exist, and when an input terminal and an output terminal of the first inverter (INV1) 210 are shorted with each other, an output voltage of the first inverter (INV1) 210 may be the same as the logic threshold of the first inverter (INV1) 210. Also, in a case where the first inverter (INV1) 210 does not exist, and when an input terminal and an output terminal of the second inverter (INV2) 220 are shorted with each other, an output voltage of the second inverter (INV2) 220 may be the same as the logic threshold of the second inverter (INV2) 220.

However, as shown in FIG. 2, when the input terminal of the first inverter (INV1) 210 and the output terminal of the second inverter (INV2) 220 are shorted with each other and thereby are connected to the first node, and the output terminal of the first inverter (INV1) 210 and the input terminal of the second inverter (INV2) 220 are shorted with each other and thereby are connected to the second node, a different result may be obtained.

When the first node and the second node are shorted with each other using a switch 230, a voltage value of the shorted first node and second node may correspond to a value between the logic threshold of the first inverter (INV1) 210 and the logic threshold of the second inverter (INV2) 220, but may not be the average thereof.

Regardless of which logic threshold is higher between the first inverter (INV1) 210 and the second inverter (INV2) 220, the output voltage value may correspond to a value between the logic threshold of the first inverter (INV1) 210 and the logic threshold of the second inverter (INV2) 220 while the switch 230 is closed.

When the switch 230 is re-opened to thereby open a connection between the first node and the second node, a logic level of the voltage value of any one of the first node and the second node may be "0" and a logic level of another voltage value may be "1".

For example, when it is assumed that the logic threshold of the first inverter (INV1) 210 is lower than the logic threshold of the second inverter (INV2) 220, the switch 230 may be closed whereby a voltage of the first node may be higher than the logic threshold of the first inverter (INV1) 210 while the first node and the second node are being shorted with each other.

When the switch 230 is re-opened to thereby open a connection between the first node and the second node, the first inverter (INV1) 210 may recognize a logic level of a voltage of the first node, that is, the input terminal of the first inverter (INV1) 210, as high and thereby make a logic level of a voltage of the second node, that is, the output terminal of the first inverter (INV1) 210, as low.

In this case, the second inverter (INV2) 220 may recognize a logic level of a voltage of the second node, that is, the input terminal of the second inverter (INV2) 220, as low and thereby may make a logic level of a voltage of the first node, that is, the output terminal of the second inverter (INV2) 220, as high.

Specifically, a logic level of the voltage of the second terminal that is an output terminal OUT of FIG. 2 may become high.

Conversely, when it is assumed that the logic threshold of the first inverter (INV1) 210 is higher than the logic threshold of the second inverter (INV2) 220, the switch 230 may be closed whereby the voltage of the first node may be lower than the logic threshold of the first inverter (INV1) 210 while the first node and the second node are being shorted with each other.

Accordingly, when the switch 230 is re-opened to thereby open a connection between the first node and the second node, the first inverter (INV1) 210 may recognize the logic level of the voltage of the first node, that is, the input terminal of the first inverter (INV1) 210, as low and thereby make the logic level of the voltage of the second node, that is, the output terminal of the first inverter (INV1) 210, as high.

In this case, the second inverter (INV2) 220 may recognize the logic level of the voltage of the second node, that is, the input terminal of the second inverter (INV2) 220, as high and thereby may make the logic level of the voltage of the first node, that is, the output terminal of the second inverter (INV2) 220, as low.

Specifically, the logic level of the voltage of the second terminal that is the output terminal OUT of FIG. 2 may become low.

As described above, depending on which logic threshold is higher between the first inverter 210 and the second inverter 220, the logic level of the output terminal OUT after a short-and-open operation may become high or "1", or may become low or "0".

Random chance may determine which logic threshold between the first inverter 210 and the second inverter 220, manufactured from the same process, is higher. Once the first inverter 210 and the second inverter 220 are manufactured, which logic threshold is higher does not change.

Referring to FIG. 2, an identification key of a one bit may be generated. Here, a probability that the identification key is generated as "1" may be the same as a probability that the identification key is generated as "0". However, once the circuit is manufactured, the determined value is not changed. Once the circuit is manufactured, the circuit always generates the same identification key whenever the identification key is generated.

Figure 3:
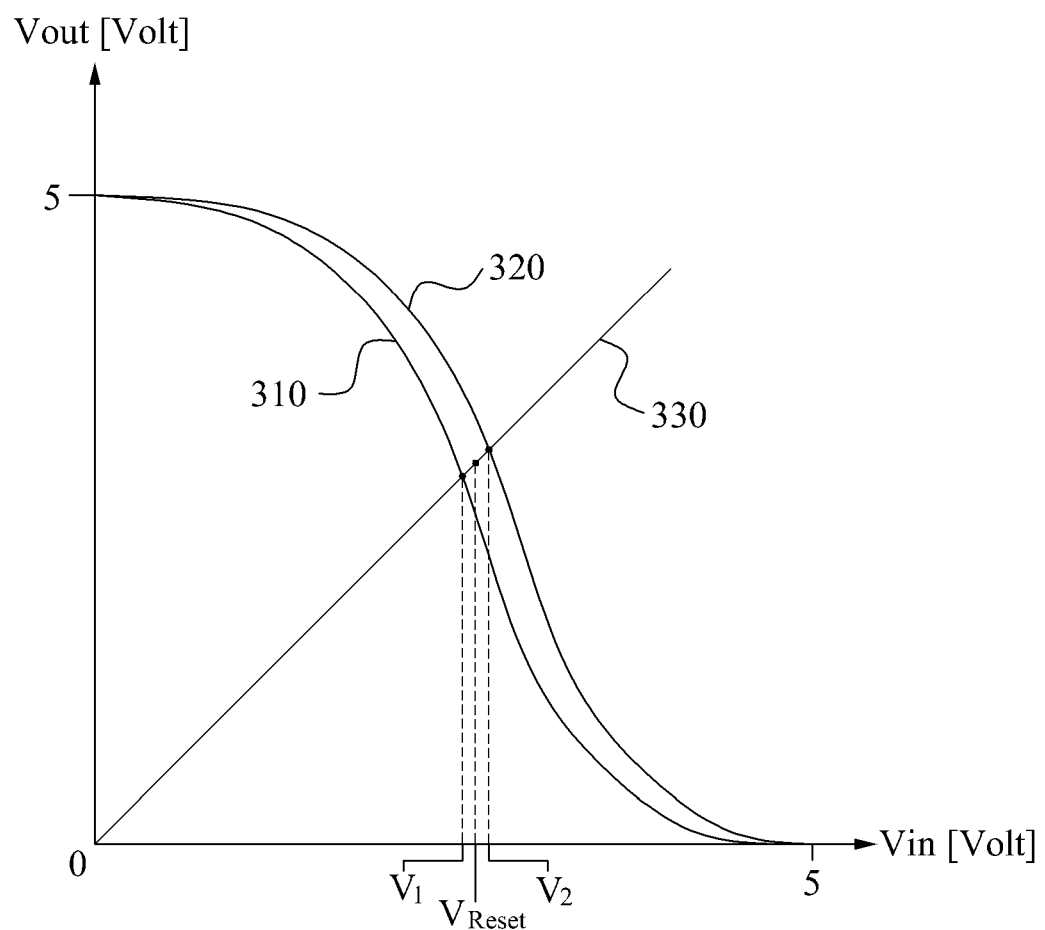
FIG. 3 is a graph illustrating a difference between logic thresholds of two inverters of FIG. 2.

It will be more clearly understood with reference to a graph of FIG. 3.

The graph of FIG. 3 shows a voltage characteristic curve in a case where the logic threshold of the first inverter 210 is lower than the logic threshold of the second inverter 220, among embodiments described above with reference to FIG. 2.

Referring to FIG. 3, a curve 310 denotes a voltage characteristic curve of the first inverter (INV1) 210, and a curve 320 denotes a voltage characteristic curve of the second inverter (INV2) 220. When the first inverter (INV1) 210 and the second inverter (INV2) 220 are manufactured from the same process, the curves 310 and 320 may nearly match each other. However, some difference may exist due to a process variation.

When an intersecting point between the curve 310 and a linear line 330 with a slope of 1 is found, a logic threshold $V_1$ of the first inverter (INV1) 210 may be determined. Also, when an intersecting point between the curve 320 and the linear line 330 is found, a logic threshold $V_2$ of the second inverter (INV2) 220 may be determined.

In the present embodiment, the logic threshold $V_1$ is lower than logic threshold $V_2$. Therefore, when the switch 230 of FIG. 2 is closed whereby the first node and the second node are shorted with each other (hereinafter, "Reset"), a voltage $V_{Reset}$ of the first node and the second node may correspond to any one between the logic threshold $V_1$ and the logic threshold $V_2$.

When the switch 230 is re-opened to thereby open the connection between the first node and the second node, the first inverter (INV1) 210 may recognize a logic level of the voltage $V_{Reset}$ of the first node as high and thereby make a logic level of the voltage of the second node, that is, the output terminal of the first inverter (INV1) 210 as low.

In this case, the second inverter (INV2) 220 may recognize a logic level of the voltage $V_{Reset}$ of the second node as low and thereby make a logic level of the voltage of the first node, that is, the output terminal of the second inverter (INV2) 220, as high.

Accordingly, the logic level of the voltage of the second terminal that is the output terminal OUT of FIG. 2 may become high.

Figure 4:
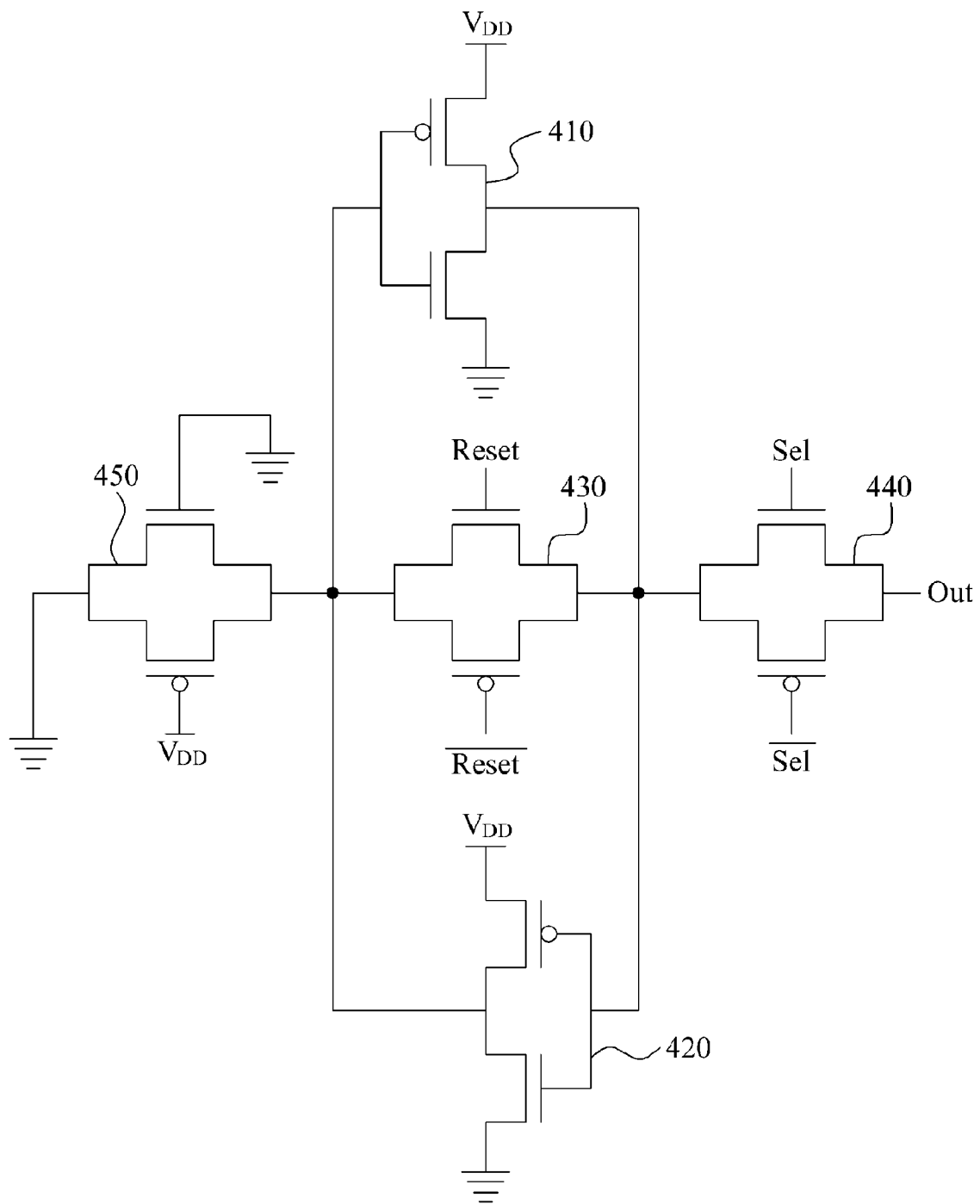
FIG. 4 is a circuit diagram illustrating a circuit of FIG. 1 using a complementary metal-oxide semiconductor (CMOS) inverter and a transmission gate according to an embodiment of the present invention.

FIG. 4 is a circuit diagram illustrating a circuit of FIG. 1 using a complementary metal-oxide semiconductor (CMOS) inverter and a transmission gate according to an embodiment of the present invention.

The CMOS inverter may be provided as an inverter element on a semiconductor chip. The CMOS inverter may include a single p-channel MOS (PMOS) and a single n-channel MOS (NMOS), and may invert a logic level of an input terminal to provide the inverted logic level of the input terminal as a logic level of an output terminal.

An input terminal of a first inverter 410 and an output terminal of a second inverter 420 may be connected to a first node. An output terminal of the first inverter 410 and an input terminal of the second inverter 420 may be connected to a second node.

When a logic level "1" is input into a reset terminal of a first switch 430, the first node and the second node may be shorted with each other. In this case, a logic level "0" may be input into a sel terminal of a second switch 440 disposed between an out terminal and the second node, and thus the second switch 440 may be open.

A third switch 450 connected between the first node and a ground may be a dummy switch that is open at all times, that is, is always in an open status. As described above with reference to FIG. 1, since the third switch 450 exists, a circuit symmetry may be maintained. Also, it is possible to maintain an electrical characteristic of both sides of the circuit, for example, a capacitance, and the like to be the same as each other.

When the logic level of the reset terminal is changed from "1" to "0", the first switch 430 may be open whereby the logic level of any one voltage of the first node and the second node may become "1" and the logic level of another voltage may become "0". Until this time, the logic level of the sel terminal of the second switch 440 may be maintained at "0".

When the logic level "1" is input into the sel terminal, the second switch 440 may be closed and the voltage of the second node may be transferred to the out terminal. In this case, it is possible to measure the logic level of the voltage of the out terminal and to recognize a one-bit identification key generated by the semiconductor chip of FIG. 4.

Figure 5:
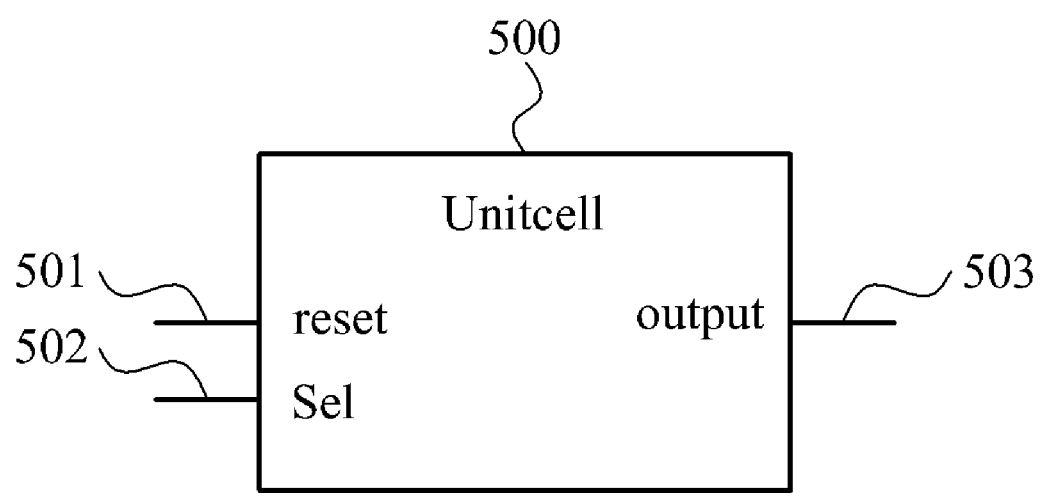
FIG. 5 is a diagram illustrating a semiconductor chip of FIG. 1 based on a unit cell block.

FIG. 5 is a diagram illustrating a semiconductor chip 100 of FIG. 1 based on a unit cell block.

According to an embodiment of the present invention, the semiconductor chip 100 for generating an identification key using a process variation may be included in a portion of a large scaled semiconductor chip. In this case, the semiconductor chip 100 may be expressed using a unit cell 500.

The reset terminal of the first switch 130 of FIG. 1 may refer to a reset terminal 501, the sel terminal 141 of the second switch 140 may refer to a sel terminal 502, and the output terminal 143 may refer to an output terminal 503. Other terminals such as a direct current (DC) voltage, a ground terminal, and the like are not shown in FIG. 5.

According to an embodiment of the present invention, a logic level "1" may be input into the reset terminal 501, and a logic level "0" may be input into the sel terminal 502. The logic level of the reset terminal 501 may be changed from "1" to "0". Next, an identification key of "1" or "0" may be recognized by changing the logic level of the sel terminal 502 from "0" to "1" and by measuring a logic level of the output terminal 503.

As described above, in this case, a probability that the logic level of the output terminal 503 is "1" may be the same as a probability that the logic level of the output terminal 503 is "0". Regardless of the number of times the above process is repeated, the determined value may not be changed.

The circuit of FIG. 4 may also be expressed using the unit cell 500.

Figure 6:
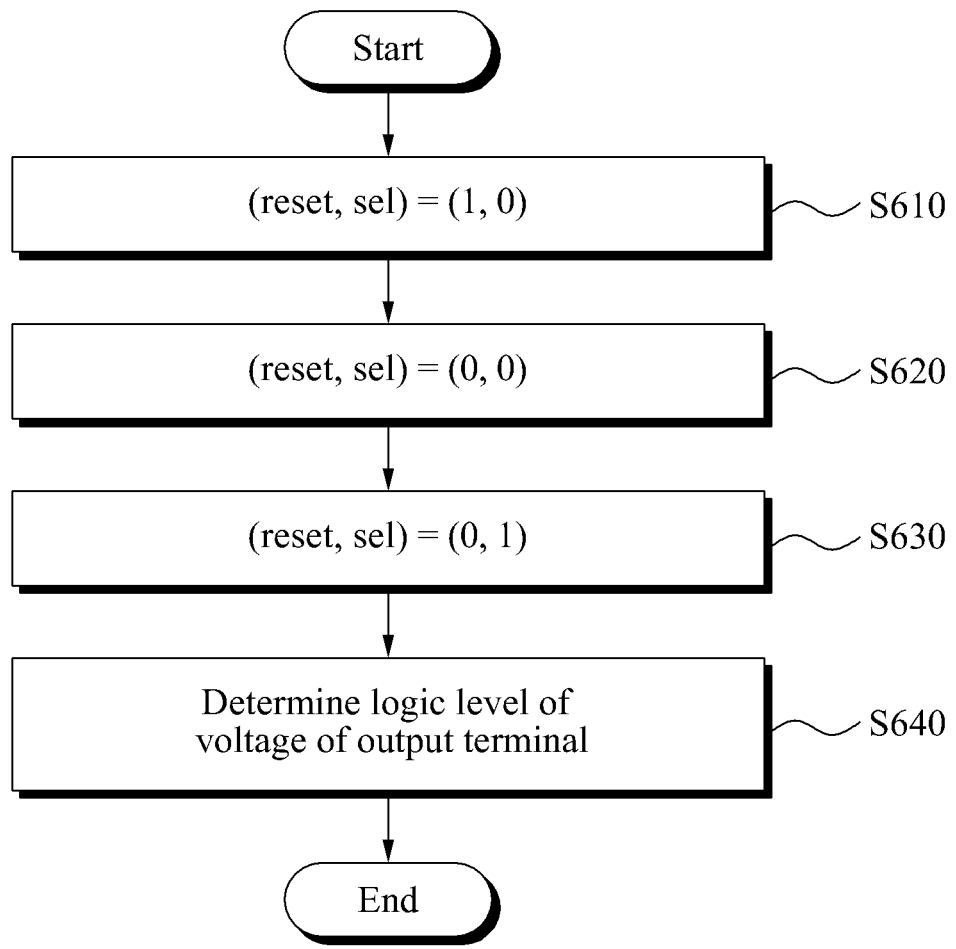
FIG. 6 is a flowchart illustrating a process of determining a logic level of a voltage to be input into each terminal of the unit-cell block of FIG. 5 according to an embodiment of the present invention.

FIG. 6 is a flowchart illustrating a process of determining a logic level of a voltage to be input into each terminal of the unit-cell block of FIG. 5 according to an embodiment of the present invention.

In operation 5610, logic levels "1" and "0" may be input into the reset terminal 501 and the sel terminal 502 of the unit cell 500, respectively. In this case, the first node 101 of FIG. 1 and the second node 102 may be shorted with each other. A voltage of the shorted first node 101 and second node 102 may correspond to a value between a logic threshold of the first inverter 110 and a logic threshold of the second inverter 120.

In operation S620, the logic level of the reset terminal 501 may be changed from "1" to "0". The logic level of the sel terminal 502 may be maintained at "0".

In operation S630, the logic level of the sel terminal 502 may be changed from "0" to "1". The logic level of the reset terminal 501 may be maintained at "0". Next, the switch 140 may be closed and a voltage of the second node 102 may be transferred to the output terminal 503.

In operation S640, it may be determined whether the logic level of the voltage of the output terminal 503 is "0" or "1". Here, a probability that the logic level of the output terminal 503 is "1" may be the same as a probability that the logic level of the output terminal 503 is "0".

Even though operation S610 and S620 are repeatedly performed on the unit cell 500, the decision result of operation S640 may be the same.

Figure 7:
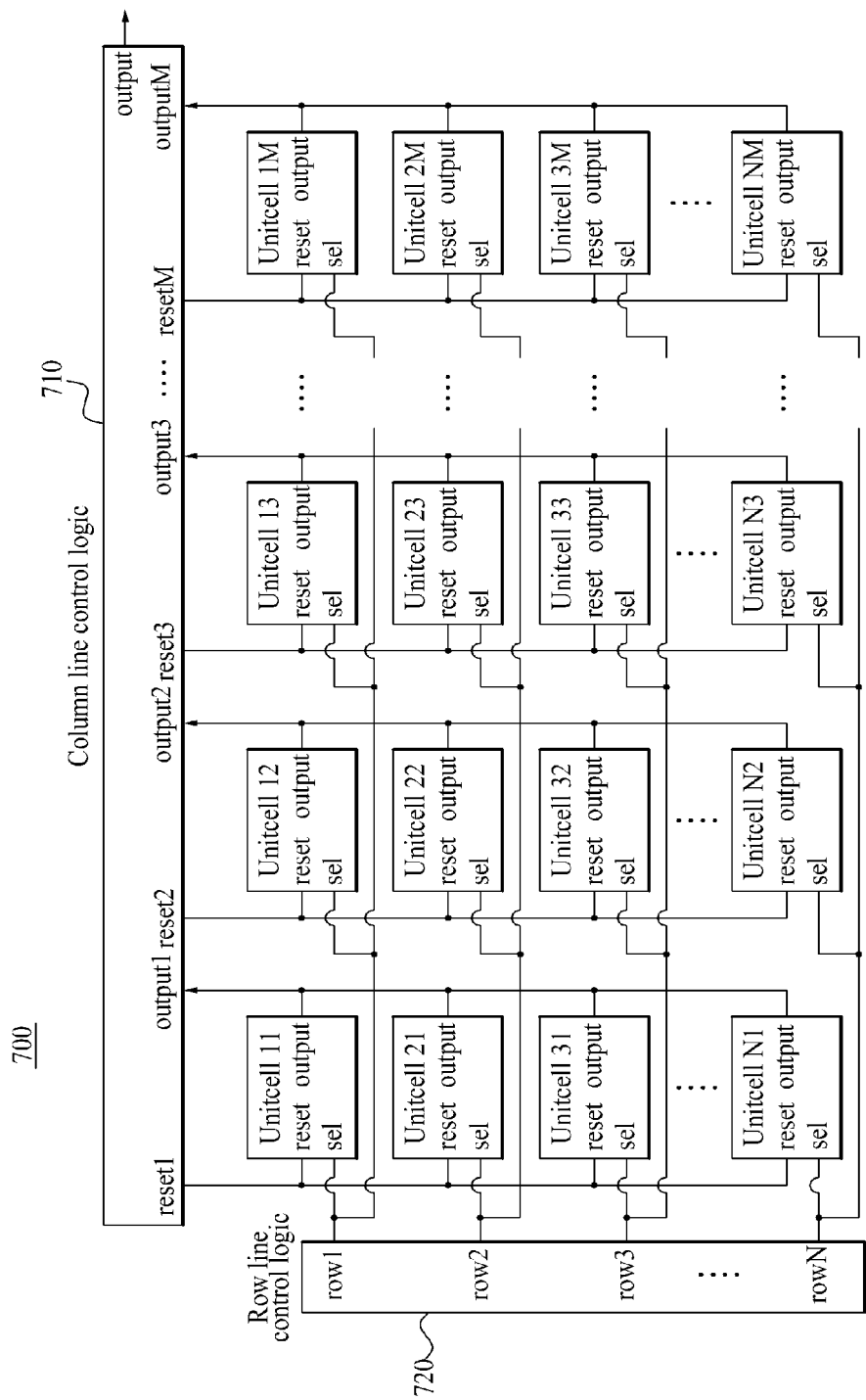
FIG. 7 is a diagram illustrating a semiconductor chip used to generate an identification key of (M+N) bits using M×N unit cells according to an embodiment of the present invention.

FIG. 7 is a diagram illustrating a semiconductor chip 700 used to generate an identification key of (M+N) bits using M×N unit cells according to an embodiment of the present invention.

A column line control logic 710 may assign a first input signal to a reset terminal of each unit cell and measure a logic level of a voltage of an output terminal thereof to obtain an identification key.

A row line control logic 720 may assign a second input signal to a sel terminal of each unit cell.

According to an embodiment of the present invention, the column line control logic 710 may apply a voltage of a logic level "1" to M terminals (reset1, reset2, reset3, ..., resetM). In this case, the row line control logic 720 may maintain a logic level of N terminals (row1, row2, row3, ..., rowN) at "0".

The column line control logic 710 may change the logic level of the M terminals (reset1, reset2, reset3, ..., resetM) from "1" to "0".

When the row line control logic 720 changes the logic level of the terminal row1 from "0" to "1", the column line control unit 710 may recognize the identification key of M bits corresponding to M unit cells (unitcell 11, unitcell 12, unitcell 13, ..., unitcell 1M).

The row line control logic 720 may change again the logic level of the terminal row1 from "1" to "0", and change the logic level of the terminal row2 from "0" to "1". In this case, the column line control logic 710 may recognize the identification key of M bits corresponding to M unit cells (unicell 21, unitcell 22, unitcell 23, ..., unitcell 2M).

When the above process is repeated to the terminal rowN, the identification key of M bits may be recognized N times. Therefore, the semiconductor chip 700 may recognize the identification key of a total of M×N bits.

Figure 8:
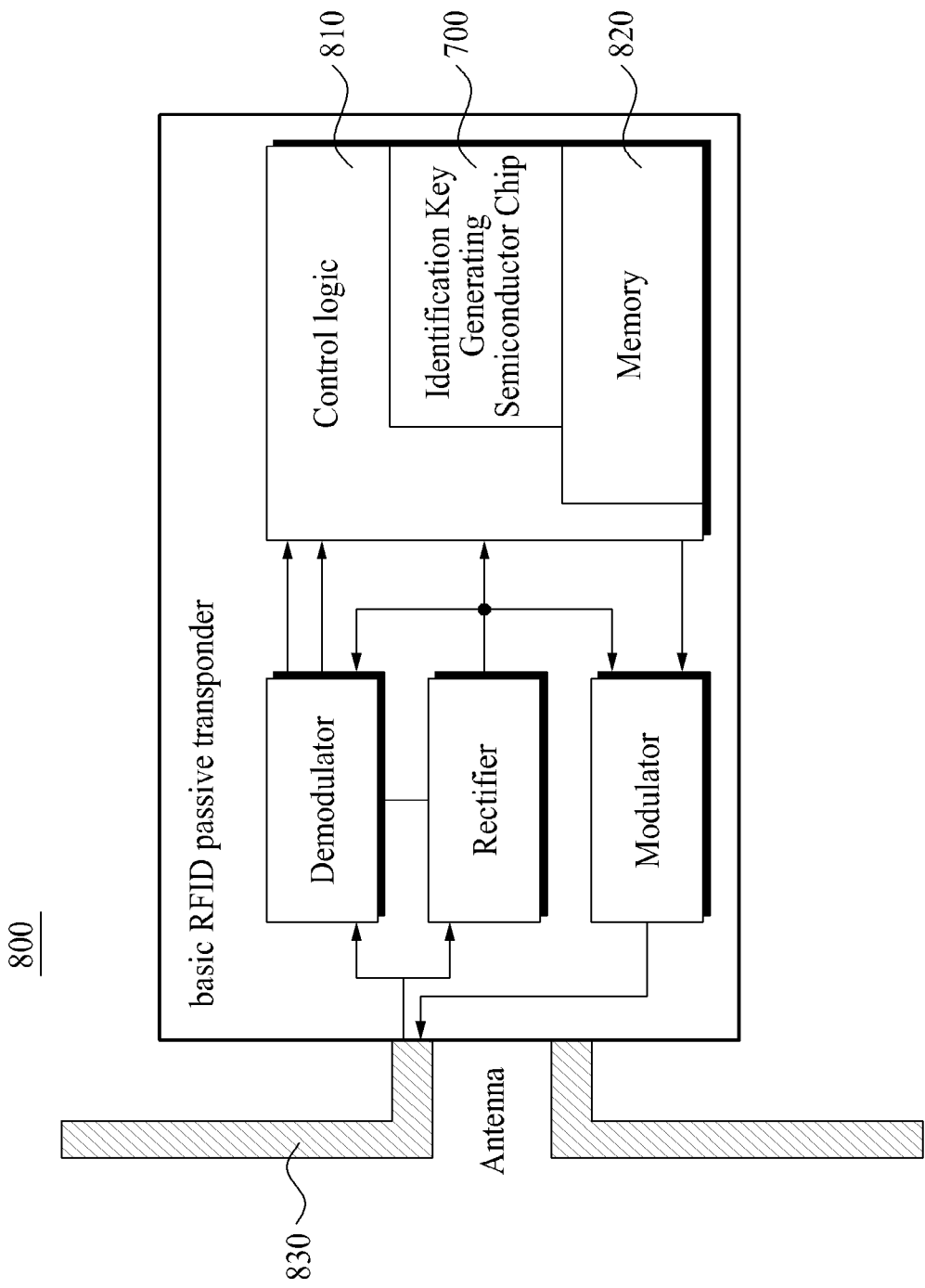
FIG. 8 is a block diagram illustrating a Radio Frequency Identification (RFID) communication apparatus including a semiconductor chip according to an embodiment of the present invention.

FIG. 8 is a block diagram illustrating a Radio Frequency Identification (RFID) communication apparatus 800 including a identification key generating semiconductor chip 700 according to an embodiment of the present invention.

The RFID communication apparatus 800 may transmit and receive data, for example, identification information and the like via an antenna 830. It is apparent to those skilled in the art that the RFID communication apparatus 800 may be implemented on a single semiconductor chip or a plurality of semiconductor chips. It is understood to those of ordinary skill in the art that an apparatus or a system according to embodiments of the present invention may be implemented on a semiconductor chip or using a plurality of semiconductor chips.

The RFID communication apparatus 800 may include a unique identification key, for example, a 128-bit binary number. According to an embodiment of the present invention, the identification key of M×N bits may be generated by the identification key generating semiconductor chip 700.

A control logic 810 may approach the (M×N)-bit identification key generated by the identification key generating semiconductor chip 700. The control logic 810 may use the identification key in order to exchange the identification information of the RFID communication apparatus 800 with an external device.

The generated (M×N)-bit identification key may not be stored in a storage element such as a memory 820 and may be directly read from the control logic 810 only as necessary. Therefore, a high level of security may be guaranteed.

Although the external device attempts to duplicate data of the memory 820, the unique identification key is not exposed.

Figure 9:
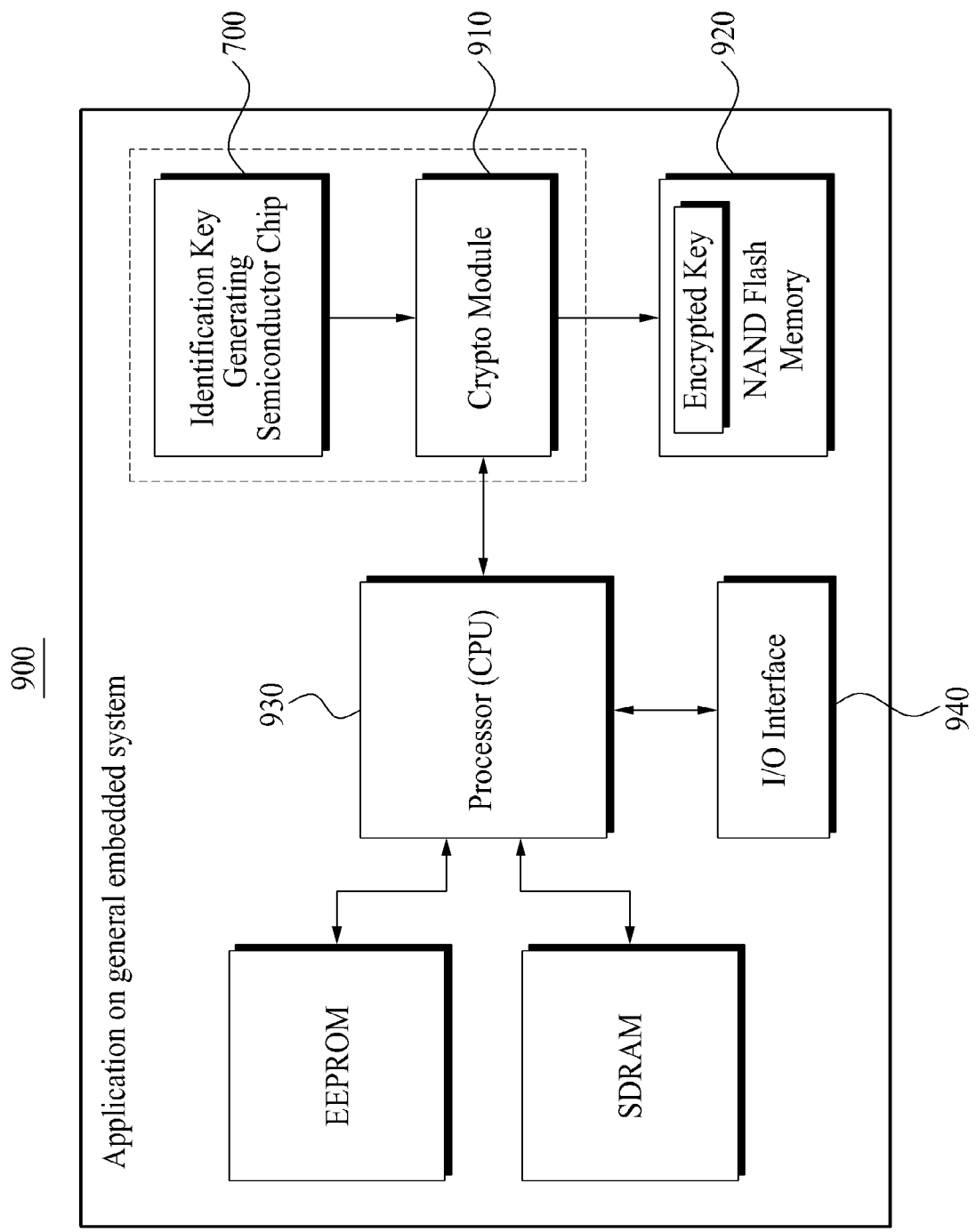
FIG. 9 is a block diagram illustrating an embedded system including a semiconductor chip according to an embodiment of the present invention.

FIG. 9 is a block diagram illustrating an embedded system 900 including an identification key generating semiconductor chip 700 according to an embodiment of the present invention.

The embedded system 900 may perform an electronic signature function and the like according to a symmetric key encryption algorithm. The embedded system 900 may be, for example, an automated prescription issuing machine of a hospital. However, it is only an example and thus the present invention is not limited thereto. The present invention may be applicable to various types of embedded systems such as an automated teller machine (ATM).

The semiconductor chip 700 may provide a generated identification key of M×N bits to a crypto module 910. The crypto module 910 may generate an encrypted key using the identification key of the M×N bits. The generated encrypted key may be stored in a storage element, for example, a NAND flash memory 920.

A processor 930, for example, a central processing unit (CPU) may communicate with an outside using an input/output (I/O) interface 940.

Figure 10:
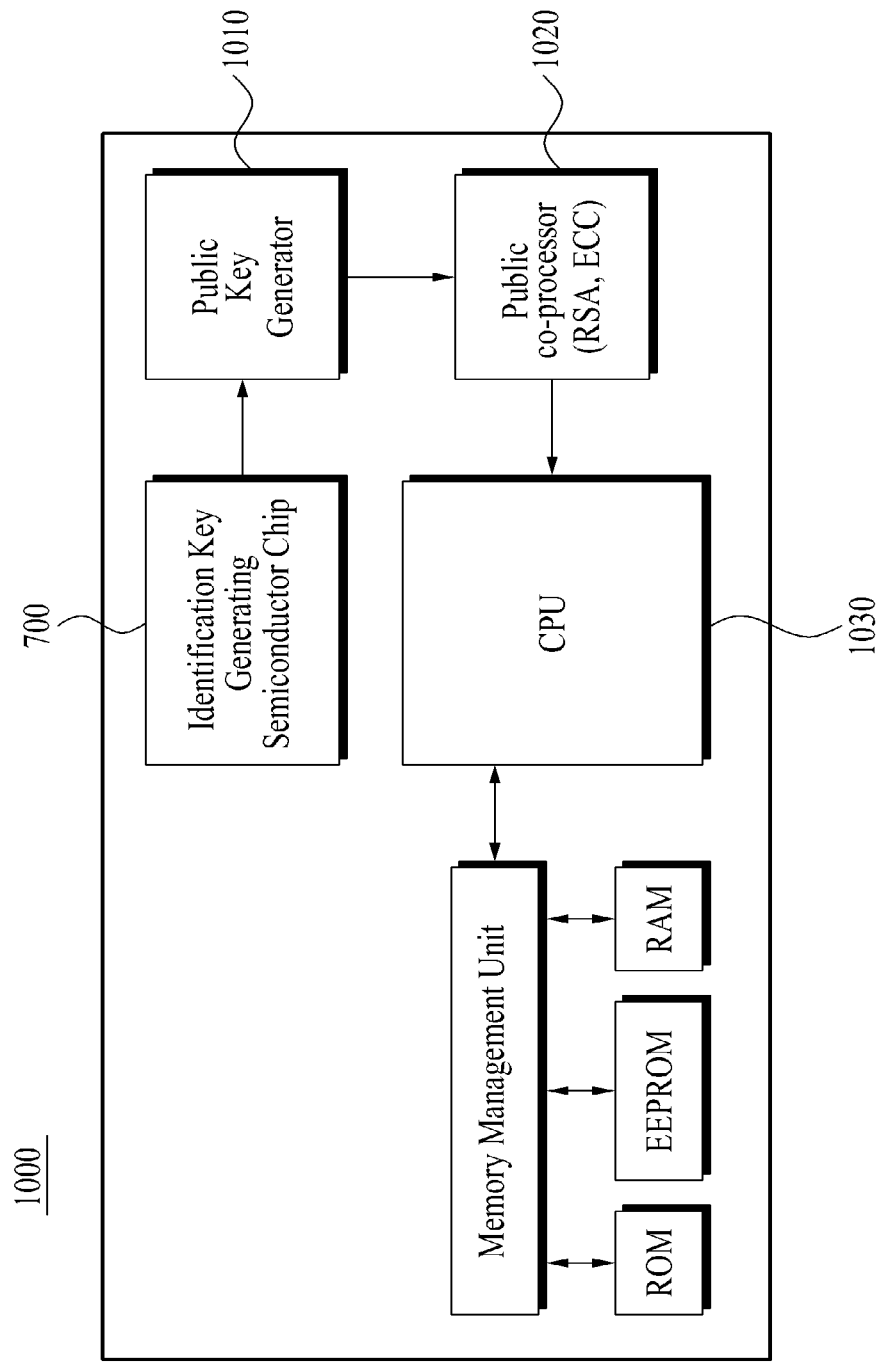
FIG. 10 is a block diagram illustrating a public key-based communication system including a semiconductor chip according to an embodiment of the present invention.

FIG. 10 is a block diagram illustrating a public key-based communication system 1000 including an identification key generating semiconductor chip 700 according to an embodiment of the present invention.

In the public key-based communication system 1000, a semiconductor chip 700 may generate an identification key of M×N bits to provide the generated identification key to a public key generator 1010. The public key generator 1010 may generate a public key using the identification key, and transfer the public key to a public co-processor 1020, for example, a Rivest-Shamir-Aleman (RSA) encryption processor, an Elliptic Curve Cryptosystem (ECC) encryption processor, and the like.

A CPU 1030 may communicate with the outside using the aforementioned public key encryption scheme.

Figure 11:
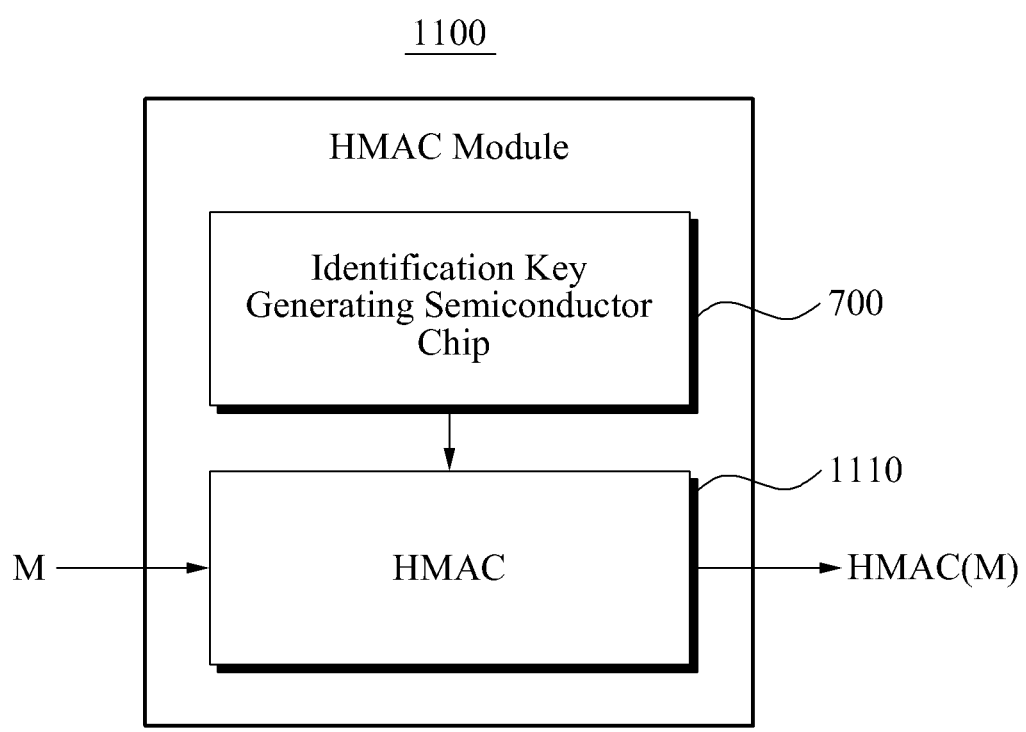
FIG. 11 is a block diagram illustrating a Hash Message Authentication Code (HMAC) module including a semiconductor chip according to an embodiment of the present invention.

FIG. 11 is a block diagram illustrating a Hash Message Authentication Code (HMAC) module 1100 including an identification key generating semiconductor chip 700 according to an embodiment of the present invention.

The HMAC module may include the identification key generating semiconductor chip 700 and an HMAC processor 1110.

Here, a message authentication code (MAC) is a code to authenticate an accuracy of a message. There are several method to support the MAC, such as 1) an unconditionally secure scheme, 2) a hash function-based scheme, 3) a stream cipher-based scheme, 4) a block cipher-based scheme, and so on.

The HMAC processor 110 may process a message M using a hash function to generate a processed message HMAC(M). In this process, the HMAC processor 1110 may use an identification key generated by the identification key generating semiconductor chip 700.

Figure 12:
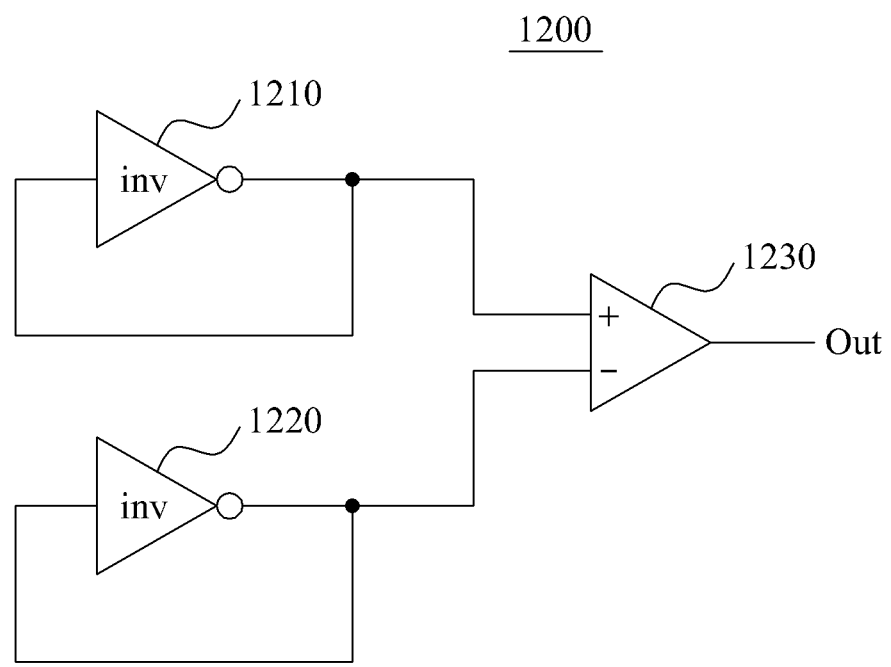
FIG. 12 is a diagram illustrating an apparatus based on a process variation of logic thresholds of two inverters according to an embodiment of the present invention.

FIG. 12 is a diagram illustrating a semiconductor chip 1200 used to generate an identification key using a logic threshold difference resulted from a process variation of two inverters according to an embodiment of the present invention.

Referring to FIG. 12, the semiconductor chip 1200 may include a first inverter 1210, a second inverter 1220, and a comparator 1230.

According to an embodiment of the present invention, the first inverter 1210 and the second inverter 1220 may be manufactured from the same process. However, as described above, a logic threshold of the first inverter 1210 may be different from a logic threshold of the second inverter 1220 due to the process variation.

In the present embodiment, an input terminal and an output terminal of the first inverter 1210 may be shorted with each other and be connected to a first input terminal of the comparator 1230. An input terminal and an output terminal of the second inverter 1220 may be shorted with each other and be connected to a second input terminal of the comparator 1230.

In this case, a voltage value of the first input terminal of the comparator 1230 may be the same as the logic threshold of the first inverter. A voltage of the second input terminal of the comparator 1230 may be the same as the logic threshold of the second inverter 1220.

Specifically, the comparator 1230 may compare the logic threshold of the first inverter and the logic threshold of the second inverter 1220 and determine which logic threshold is higher. Depending on a decision result, the comparator 1230 may change a voltage value of an out terminal.

The identification key generated by the semiconductor chip 1200 may be recognized as a one-bit digital value of "0" or "1" depending on the voltage value of the out terminal.

Like the semiconductor chip of FIG. 1, the semiconductor chip 1200 may function as a unit cell. In this case, the identification key of N bits may be generated using a plurality of semiconductor chips 1200. It will be further described in detail with reference to FIG. 13.

Figure 13:
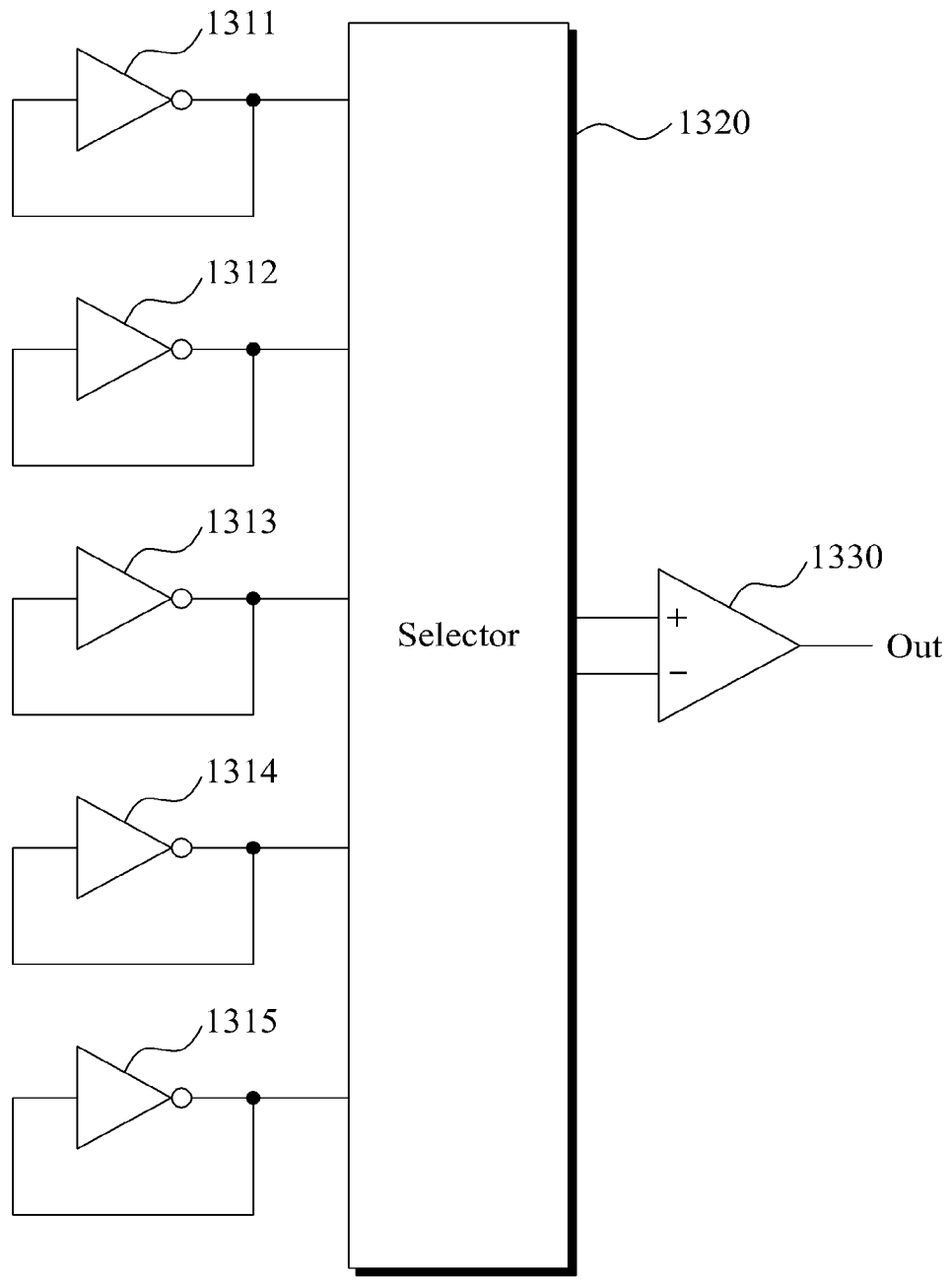
FIG. 13 is a diagram illustrating a semiconductor chip according to an embodiment of the present invention.

FIG. 13 is a diagram illustrating a semiconductor chip 1300 according to an embodiment of the present invention.

Referring to FIG. 13, the semiconductor chip 1300 may include a plurality of inverters, for examples, five inverters 1311, 1312, 1313, 1314, and 1315, a selector 1320, and a comparator 1330.

The selector 1320 may select two inverters, for examples, the inverters 1312 and 1313, from the five inverters 1311, 1312, 1313, 1314, and 1315.

In this case, the comparator 1330 may compare a logic threshold of the inverter 1312 and a logic threshold of the inverter 1313 to provide an output voltage to an out terminal based on a comparison result. A one-bit identification key may be generated according to a logic level of the output voltage of the out terminal.

When the selector 1320 selects another two inverters, the comparator 1330 may generate again the one-bit identification key.

In the above example of FIG. 13, when the selector 1320 selects two inverters from the five inverters 1311, 1312, 1313, 1314, and 1315 and the comparator 1330 compares logic thresholds of the selected two inverters to thereby generate the identification key, the identification key of a maximum of 10 bits may be obtained.

Although five inverters 1311, 1312, 1313, 1314, and 1315 are illustrated in FIG. 13, the present invention is not limited thereto. A number of inverters may be variously determined based on a number of bits of the identification key, a circuit area, and the like.

An area of the comparator 1330 that may be integrated within the semiconductor chip 1300 may be relatively large in comparison to areas of the inverters 1311, 1312, 1313, 1314, and 1315. Since this aspect is considered, the plurality of inverters 1311, 1312, 1313, 1314, and 1315 may be connected to the comparator 1330 via the selector 1320. However, the present invention is not limited thereto. According to another embodiment of the present invention, two inverters and a single comparator may constitute a pair to thereby generate an N-bit identification key.

Figure 14:
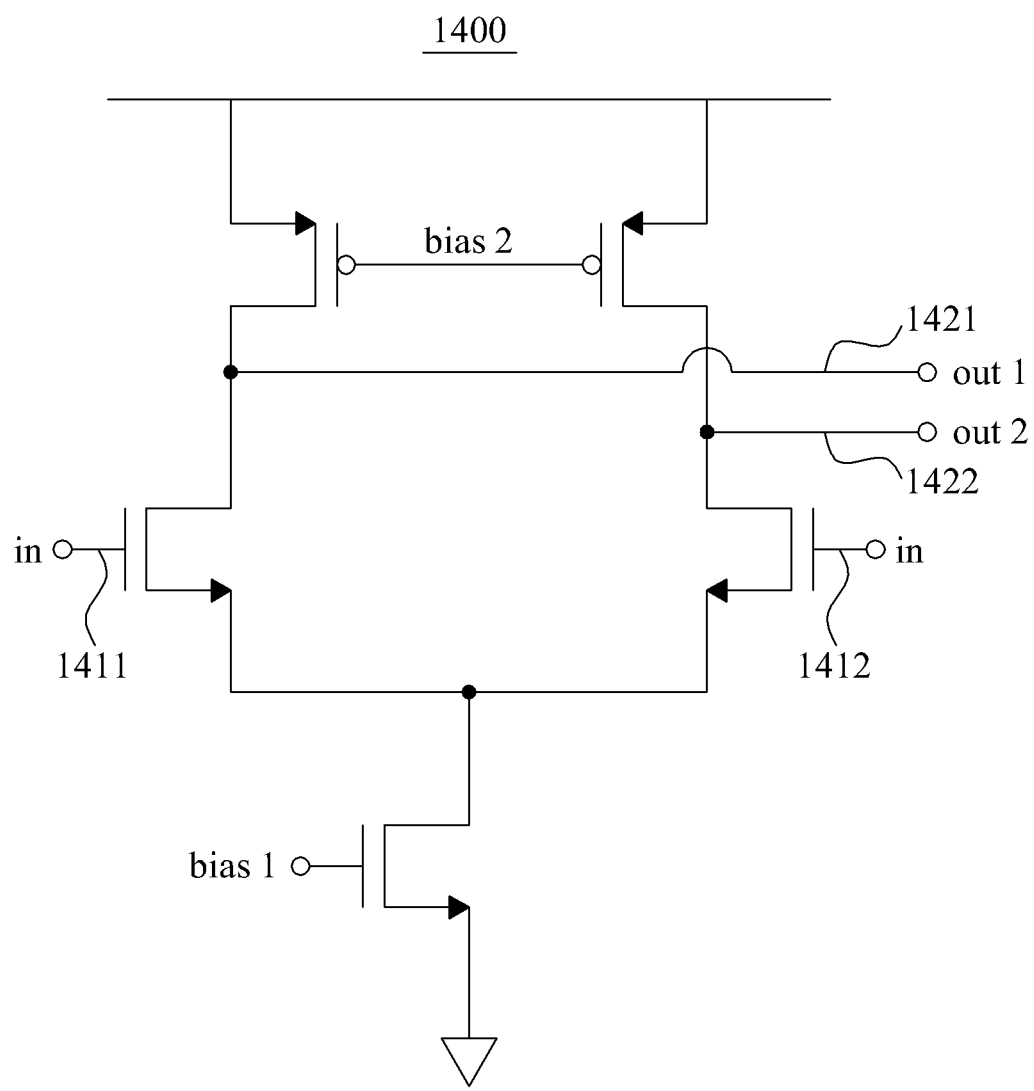
FIG. 14 is a diagram illustrating a semiconductor chip used to generate an identification key based on a process variation of a differential amplifier according to an embodiment of the present invention.

FIG. 14 is a diagram illustrating a semiconductor chip 1400 used to generate an identification key based on a process variation of a differential amplifier according to an embodiment of the present invention.

The semiconductor chip 1400 including a differential amplifier, which is made up of at least one of a transistor and a resistance, may amplify a voltage difference between a first input terminal 1411 and a second input terminal 1412 to provide the amplified voltage difference as a voltage difference between a first output terminal 1421 and a second output terminal 1422.

Therefore, when the first input terminal 1411 and the second input terminal 1412 are shorted with each other, the voltage difference between the first output terminal 1421 and the second output terminal 1422 corresponding to an output voltage value may need to be, theoretically, zero.

However, due to an electrical characteristic difference between elements caused by the process variation, the voltage of the first output terminal 1421 and the voltage of the second output terminal 1422 may not be exactly the same as each other.

Accordingly, when the voltage of the first output terminal 1421 and the voltage of the second output terminal 1422 are compared using the same scheme as described above with reference to FIG. 12, a one-bit identification key may be generated.

For example, in a case where the first input terminal 1411 and the second input terminal 1412 are shorted with each other, and when a voltage value of the first output terminal 1421 is higher than a voltage value of the second output terminal 1422, a digital value may be recognized as "1", and otherwise, the digital value may be recognized as "0".

Also, when N unit cells are constructed by using the semiconductor chip 1400 as a unit cell, an N-bit identification key may be generated. It will be further described in detail with reference to FIG. 15.

A voltage difference between output terminals of the differential amplifier circuit may occur due to an electrical characteristic difference of the transistor. Also, due to an electrical characteristic difference of passive elements (not shown) such as a resistance, a capacitance, an inductor, and the like, that may be included in the semiconductor chip 1400, the voltage difference may occur Specifically, the process variation, resulting from a chip manufacturing process, may cause a structural difference of the passive elements and thus the elements may have a difference in an actual numeral value.

Although not illustrated in FIG. 14, an element such as the comparator 1230 of FIG. 12 may be used to compare the voltage value of the first output terminal 1421 and the voltage value of the second output terminal 1422.

Figure 15:
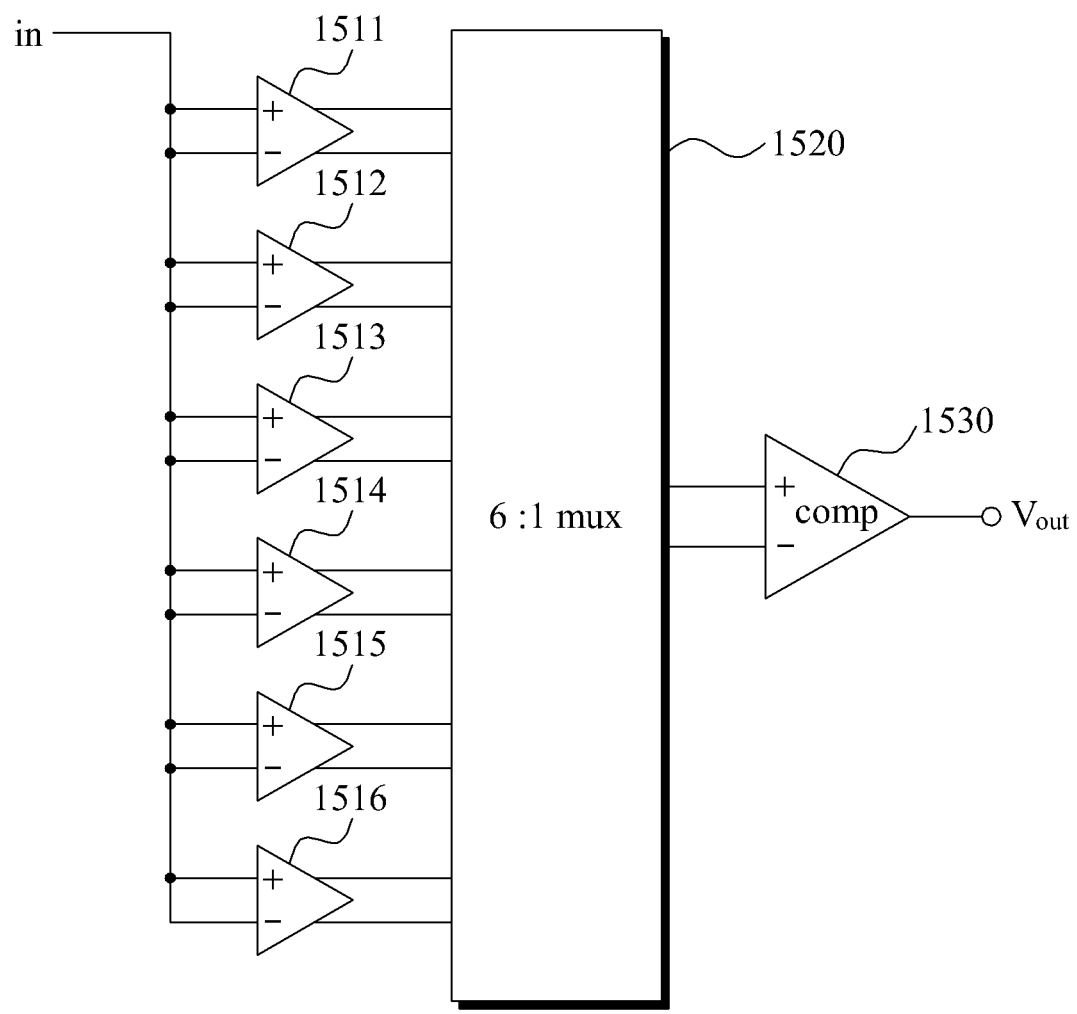
FIG. 15 is a diagram illustrating a semiconductor chip according to an embodiment of the present invention.

FIG. 15 is a diagram illustrating a semiconductor chip 1500 according to an embodiment of the present invention.

Referring to FIG. 15, the semiconductor chip 1500 may include a plurality of differential amplifiers, for example, six differential amplifiers 1511, 1512, 1513, 1514, 1515, and 1516, a selector 1520 to select any one from the differential amplifiers 1511, 1512, 1513, 1514, 1515, and 1516, and a comparator 1530. The comparator 1530 may compare two output voltages of a differential amplifier selected by the selector 1520 to generate a one-bit identification key.

In this case, all the input terminals of the six differential amplifiers 1511, 1512, 1513, 1514, 1515, and 1516 may be shorted with each other and have the same voltage.

According to an embodiment of the present invention, the selector 1520 may be a 6:1 MUX. However, it is only an example and thus the present invention is not limited thereto. Therefore, a number of input/output ports of the MUX may be changed. Also, another element may be used for the selector 1520. The 6:1 MUX may output, to two output terminals, output voltages of the six differential amplifiers 1511, 1512, 1513, 1514, 1515, and 1516 that are input using 12 input terminals. The two output terminals may be connected to two input terminals of the comparator 1530.

In the present embodiment, the semiconductor chip 1500 may generate a 6-bit identification key.

Also, an area of the comparator 1530 that may be integrated within the semiconductor chip 1500 may be relatively large in comparison to areas of the differential amplifiers 1511, 1512, 1513, 1514, 1515, and 1516. Since this aspect is considered, the plurality of differential amplifiers 1511, 1512, 1513, 1514, 1515, and 1516 may be connected to the comparator 1530 via the selector 1520. However, the present invention is not limited thereto. Specifically, a number of differential amplifiers connected to a single comparator may be variously determined based on a number of bits of an identification key, a circuit area, process constraints, and the like.

According to some embodiments of the present invention, it is possible to generate an identification key that is physically unreproducible and is permanent once the identification key is generated, using a process variation of a process to produce an element or a circuit consisting of a plurality of elements on a semiconductor chip.

Once the semiconductor chip according to some embodiments of the present invention is manufactured, an identification key generated by the semiconductor chip maintains the same value and does not change. That is, the same value can be obtained at any time from the semiconductor chip according to an embodiment of the present invention, once the semiconductor chip is manufactured.

Since some embodiments of the present invention are based on process variation, even if two semiconductor chips are manufactured by the same process, identification keys generated by the two semiconductor chips are different when the identification keys have sufficient length, for example 128 bits.

Also, since some embodiments of the present invention are based on process variation, a semiconductor chip that produces the same identification key as another semiconductor chip cannot be manufactured when the identification keys have sufficient length, for example 128 bits. That is, identification keys generated by some embodiments of the present invention are physically unreproducible.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware elements that are specially configured to store and perform program instructions, such as read-only memory elements (ROM) and random access memory (RAM). Examples of program instructions include both machine code, such as produced by a compiler, and files containing higher level code that may be executed by the computer using an interpreter. The described hardware elements may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A semiconductor chip comprising:
N unit cells to output an identification key of N bits, where N denotes a natural number,
wherein each of the N unit cells includes a pair of inverters and a switch, and
an input terminal of one inverter among the pair of inverters is connected to an output terminal of another inverter, an output terminal of the one inverter is connected to an input terminal of the other inverter, one terminal of the switch is connected to the input terminal of the one inverter, and another terminal of the switch is connected to the output terminal of the one inverter,
wherein, when the switch is closed, the input terminal and the output terminal of the one inverter, and the input terminal and the output terminal of the other inverter are shorted with each other, and a voltage value of the shorted terminals corresponds to a value between a logic threshold of the one inverter and a logic threshold of the other inverter.

2. The semiconductor chip of claim 1, wherein the one inverter and the other inverter are manufactured from the same process, and a logic threshold of the one inverter is different from a logic threshold of the other inverter due to a process variation.

3. The semiconductor chip of claim 1, wherein, when the switch is closed, then is re-opened, the identification key is generated based on a logic level of a voltage value of at least one of the output terminal of the one inverter and the output terminal of the other inverter.

4. The semiconductor chip of claim 3, wherein:
in a case where the switch is closed, then is re-opened,
the identification key is generated as "1" when the logic level of the voltage value of the output terminal of the one inverter is high, and
the identification key is generated as "0" when the logic level of the voltage value of the output terminal of the one inverter is low.

5. A semiconductor chip comprising:
N unit cells to output an identification key of N bits, where N denotes a natural number,
wherein each of the N unit cells includes a pair of inverters and a switch, and
an input terminal of one inverter among the pair of inverters is connected to an output terminal of another inverter, an output terminal of the one inverter is connected to an input terminal of the other inverter, one terminal of the switch is connected to the input terminal of the one inverter, and another terminal of the switch is connected to the output terminal of the one inverter, further comprising:
a second switch, being connected between the input terminal of the one inverter and a ground, to be always in an open status; and
a third switch, being connected between the output terminal of the one inverter and an output terminal of a unit cell containing the one inverter, to transfer a voltage of the output terminal of the one inverter to the output terminal of the unit cell containing the one inverter, when the identification key is required.

6. A semiconductor chip comprising:
a first inverter having a first logic threshold;
a second inverter having a second logic threshold; and
a first switch, including a first terminal and a second terminal, to short or open a connection between the first terminal and the second terminal according to an first input voltage value,
wherein an input terminal of the first inverter, an output terminal of the second inverter, and the first terminal of the first switch are connected to a first node, an output terminal of the first inverter, an input terminal of the second inverter, and the second terminal of the first switch are connected to a second node, and an identification key is generated using a difference between the first logic threshold and the second logic threshold,
wherein, when a logic level of the first input voltage value is high, the first switch shorts the first node and the second node, and a voltage value of the shorted first node and second node corresponds to a value between the first logic threshold and the second logic threshold.

7. The semiconductor chip of claim 6, wherein the first inverter and the second inverter are manufactured from the same process, and the first logic threshold is different from the second logic threshold due to a process variation.

8. The semiconductor chip of claim 6, wherein, when the logic level of the first input voltage value is changed from high to low, the identification key is generated based on the logic level of at least one of the voltage value of the first node and the voltage value of the second node.

9. The semiconductor chip of claim 8, wherein:
when the logic level of the voltage value of the second node is high, the identification key is generated as "1", and
when the logic level of the voltage value of the second node is low, the identification is generated as "0".

10. A semiconductor chip comprising:
a first inverter having a first logic threshold;
a second inverter having a second logic threshold; and
a first switch, including a first terminal and a second terminal, to short or open a connection between the first terminal and the second terminal according to an first input voltage value,
wherein an input terminal of the first inverter, an output terminal of the second inverter, and the first terminal of the first switch are connected to a first node, an output terminal of the first inverter, an input terminal of the second inverter, and the second terminal of the first switch are connected to a second node, and an identification key is generated using a difference between the first logic threshold and the second logic threshold, further comprising:
a second switch, being connected between the first node and a ground, to be always in an open status; and
a third switch, being connected between the second node and an output terminal of the semiconductor chip, to short or open a connection between the second node and the output terminal of the semiconductor chip according to an second input voltage value.

11. The semiconductor chip of claim 10, wherein, when a logic level of the first input voltage value is changed from high to low and then a logic level of the second input voltage value is changed from low to high, the identification key is generated based on a logic level of a voltage value of the output terminal.

* * * * *